United States Patent
Burns

[11] 3,898,605
[45] Aug. 5, 1975

[54] INTEGRATED OPTICAL BOLOMETER FOR DETECTION OF INFRARED RADIATION

[75] Inventor: William K. Burns, Alexandria, Va.

[73] Assignee: The United States of America as represented by the Secretary of the Navy, Washington, D.C.

[22] Filed: June 19, 1974

[21] Appl. No.: 480,914

[52] U.S. Cl................ 338/18; 73/193 R; 250/338
[51] Int. Cl.².......................................... H01C 7/08
[58] Field of Search... 338/15, 18; 73/193 R, 355 R, 73/362 AR; 250/338, 340

[56] References Cited
UNITED STATES PATENTS

| | | |
|---|---|---|
| 3,080,542 | 3/1963 | Long.................................. 338/18 |
| 3,105,906 | 10/1963 | Schultz et al. .................... 338/18 X |
| 3,106,692 | 10/1963 | McNaney............................. 338/18 |
| 3,185,842 | 5/1965 | Johnson.............................. 388/18 |

*Primary Examiner*—C. L. Albritton
*Attorney, Agent, or Firm*—R. S. Sciascia; Arthur L. Branning; M. L. Crane

[57] ABSTRACT

A fast response, room temperature integrated optical bolometer for the detection of infrared radiation. The detector element forms a waveguide boundary layer therefore the detector element is a part of the waveguide and measures the radiation which travels parallel with the detector layer. Suitable for measuring laser light output.

4 Claims, 1 Drawing Figure

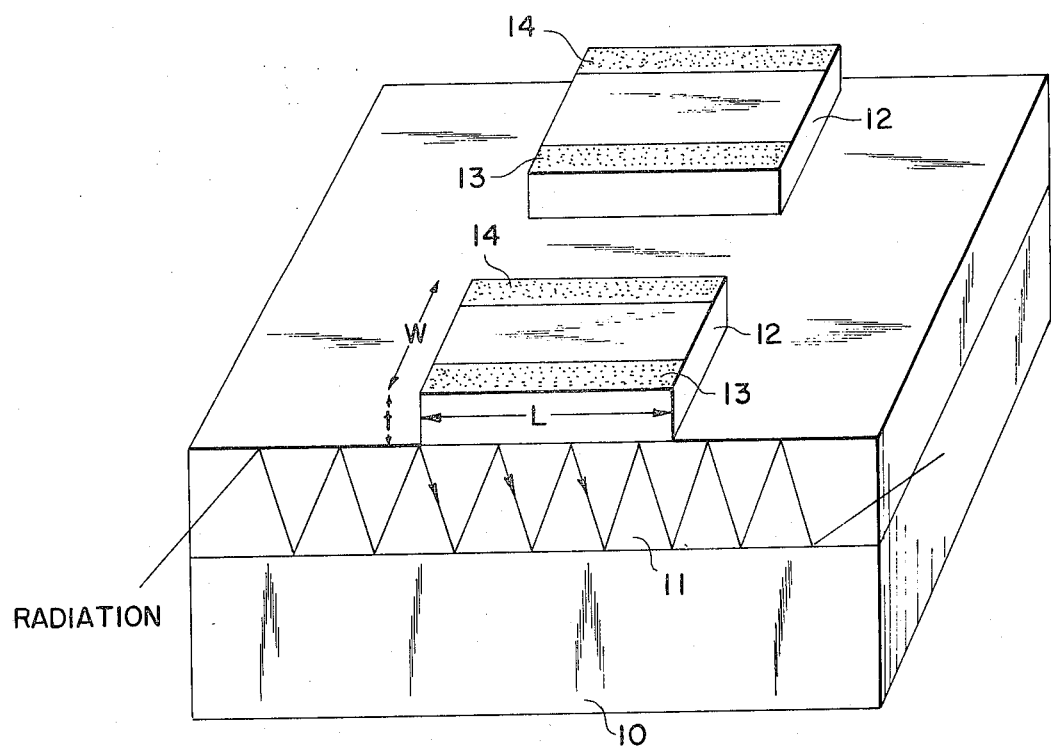

INTEGRATED OPTICAL BOLOMETER FOR DETECTION OF INFRARED RADIATION

BACKGROUND OF THE INVENTION

This invention relates to infrared radiation detectors and more particularly to a quick response detector for detecting laser radiation.

Heretofor various types of detectors such as photodetectors, photoconductors, photovoltaic detectors, the Golay cell thermocouples, pyroelectric detectors and bolometers have been used to detect radiation. Some are heat sensitive and measure the radiation due to a change in resistance which permits a current flow which is proportional to the radiation. Pat. No. 3,781,748 is directed to a chalcogenide glass type bolometer which is operative to detect electromagnetic radiation through absorption of the radiation incident on the glass. The glass increases its electrical conductivity enabling measurement of the incident radiation. This patented device measures radiation directly incident thereon normal thereto.

SUMMARY OF THE INVENTION

The application of integrated optics to the infrared spectrum requires a suitable infrared detector that can be fabricated in an integrated geometry. Desirable characteristics include nanosecond time constants, high sensitivity, room temperature operation, and small size. This invention has the desired qualities in a thin film thermal bolometer suitable for integrated optical geometry. The bolometer is in the form of a thin film of Bi or Ni evaporated onto a high thermal conductivity infrared waveguide with electrical contacts applied to each end of the thin film. Radiation passing through the waveguide is partially absorbed in the film on each wave incidence causing the film to be heated due to absorption. The heat changes the resistivity of the film to permit a current flow. A measure of the current flow determines the amount of infrared radiation.

An optical waveguide is a slab of dielectric material which confines light by multiple total internal reflections. The dielectric material has an index of refraction which in general is greater than the medium below or above the dielectric material. The index of refraction of the medium below and above the dielectric material may have the same or unequal index of refraction. The medium on both or a single side of the dielectric material may be air.

BRIEF DESCRIPTION OF THE DRAWING

The FIGURE illustrates a perspective view of the overall device.

DESCRIPTION OF THE DEVICE

Now referring to the drawing, there is shown for illustrative purposes a perspective view of the device. As shown, the device includes a silicon substrate 10 or any other suitable material such as gallium arsenide or similar lower index, high thermal conductivity semiconductor. A germanium film 11 or any other suitable high thermal conductivity, higher index material is formed onto the substrate and forms the infrared waveguide. A Bi or Ni film 12 is evaporated onto the Ge film and forms the bolometer section. The bolometer has a width, W, which is as wide as the guided radiation mode, a length, L, along the direction of the radiation sufficiently long to absorb sufficient heat to be measured. The thickness, $t$, of the bolometer film is chosen small enough that the bolometer response time is in the nanosecond range. Gold or silver electrodes 13 and 14 are evaporated onto the upper surface of the bolometer film such that the electrodes extend across the entire length of the bolometer element.

In operation, a voltage source is connected to the electrodes in series with the bolometer film so that upon heating a current will flow between the electrodes. A detector in the electrical circuit measures the current flow which is proportional to the radiation incident on the bolometer film.

This invention makes use of a thin metal film forming a waveguide boundary layer as the detector element. For metals with refractive index higher than that of the guiding layer, the guided radiation is partially reflected by and partially absorbed in the metal film. Typically infrared waveguides have high thermal conductivity so that the guiding layer and substrate form a heat sink for the bolometer. Semimetal Bi is used because it combines a low reflectivity with good absorption. Low reflectivity is necessary to achieve maximum absorption in minimum length. Response time is proportional to the square of the Bi film thickness, with a 650A thickness film having a two (2) nanosecond time constant. The fraction of incident power absorbed is determined by the bolometer film thickness and length for a given waveguide film thickness and index of refraction.

In a waveguide of Ge film on a Si substrate, with $10.6 \mu m$ radiation in the lowest order TM waveguide mode, the reflectivity of the Ge-Bi boundary causes absorption to occur over a finite distance, which in the ray optics approximation is given by $$\alpha^{-1} = \frac{2 \, W_{eq} \, \tan \theta_1}{1 - R(\theta_1)} \quad (1)$$

for $e^{-1}$ attenuation. R is the reflectivity at the interface at incidence angle $\theta_1$, and $W_{eq}$ is the equivalent waveguide thickness, which takes into account the evanescent wave in the Si substrate. The Bi film is sufficiently thick for $e^{-1}$ attenuation of the radiation transmitted through it (1600A). $\alpha^{-1}$ is a function of both the waveguide thickness and the mode effective index ($n_{eff} \sim \sin\theta_1$), which are related through the waveguide dispersion relationship. If the Ge film is made too thick, $W_{eq}$ will be large and a low order mode will propagate with $\theta_1$ near 90°, leading to a high interface reflectivity. But, if the Ge film is made too thin, $W_{eq}$ can become very large near cut off and $\alpha^{-1}$ will also be large. Minimum attenuation length occurs for a waveguide thickness which corresponds to a mode effective index near 3.5. For the TM mode in a 1.5 $\mu m$ thick waveguide, $\alpha^{-1}$ is $\sim 13 \mu m$. The TM mode gives the shortest absorption length since the reflectivity becomes very small near the principle angle of incidence.

Using the optimized values for $n_{eff}$ and $\alpha^{-1}$ discussed above, a single mode 24 ohm planar bolometer having a thickness of 1600A, a 5 $\mu m$ width, and a length of 13 $\mu m$ has been designed to have a responsivity of 0.12 volts/watt and an NEP of $6 \times 10^{-9}$ watts/Hz$^{1/2}$. A bias power of 0.5 milliwatts ($10^3$ watts/cm$^2$) was assumed in this design.

The bolometer of the present invention has a great deal of flexibility in use. The elements are very small and may be placed any place on a wave guide so that the different modes may be measured. The drawing illustrates two such detectors when each detects different modes. The width need be only as wide as the mode being detected. The length may be sufficient that substantially all radiation is absorbed over the length of the bolometer element. Shorter lengths will absorb less radiation and permit passage of more radiation through the waveguide for its intended purpose. Thus the detector system may be calibrated for total measurement or partial measurement while giving a reading for the entire radiation strength.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A fast response room temperature integrated optical waveguide-bolometer for the detection of infrared radiation traversing said waveguide in a direction parallel with the legnth of said bolometer; which comprises:
   a substrate of high thermal conductivity material;
   a layer of high thermal conductivity material on said substrate;
   said layer of high thermal conductivity material on said substrate having an index of refraction which is greater than the index of refraction of said substrate thereby forming an optical waveguide;
   at least one bolometer on said layer of high thermal conductivity material of said waveguide;
   said bolometer formed by a thin film of low reflectivity, high absorptivity, high thermal conductivity material having an index of refraction greater than that of said layer on said substrate and so positioned with the length thereof parallel with the direction of radiation passage through said waveguide.

2. A waveguide-bolometer infrared radiation detector as claimed in claim 1; which:
   said substrate is silicon; and
   said layer of high thermal conductivity material on said substrate is germanium.

3. A waveguide bolometer, infrared radiation detector, as claimed in claim 2; in which,
   said bolometer is formed by a thin film of bismuth on said waveguide layer.

4. A waveguide-bolometer infrared radiation detector as claimed in claim 3 wherein
   said thin film of bismuth has a thickness of from about 650A to about 3000A.

* * * * *